United States Patent [19]

Duran

[11] Patent Number: 4,655,657
[45] Date of Patent: Apr. 7, 1987

[54] SELF-RETAINING POSITIVE LOCKING BOLT

[75] Inventor: John A. Duran, 425 Oak Knoll Dr., Glendora, Calif. 91740

[73] Assignee: John A. Duran

[21] Appl. No.: 812,732

[22] Filed: Dec. 23, 1985

[51] Int. Cl.[4] .............................................. F16B 21/00
[52] U.S. Cl. ...................................... 411/348; 411/21; 411/946
[58] Field of Search ............... 411/21, 351, 206, 341, 411/342, 345, 348, 940, 945, 946, 971, 999; 24/453

[56] References Cited

U.S. PATENT DOCUMENTS

| | | | |
|---|---|---|---|
| 2,898,797 | 8/1959 | Bronstein | 411/348 |
| 3,180,390 | 11/1965 | Ockert . | |
| 3,712,356 | 1/1973 | Petroshanoff . | |
| 3,827,110 | 8/1974 | Dzus, Sr. et al. | 411/348 |
| 4,016,914 | 4/1977 | Zurko | 411/348 |
| 4,278,120 | 7/1981 | Hart et al. | 411/190 |
| 4,507,034 | 3/1985 | Lew et al. | 411/348 |

FOREIGN PATENT DOCUMENTS

| | | | |
|---|---|---|---|
| 906832 | 9/1962 | United Kingdom | 411/348 |
| 783494 | 11/1980 | U.S.S.R. | 411/351 |

*Primary Examiner*—Gary L. Smith
*Assistant Examiner*—Neill Wilson
*Attorney, Agent, or Firm*—Poms, Smith, Lande & Rose

[57] ABSTRACT

A self-retaining positive locking bolt having a bolt body with a spindle retained within the bolt body. A detent is mounted in the bolt extending, in a first position, out of the bolt body, and, in a second position, extending internally from the bolt body. In both positions, the detent is mounted in aligned cavities in the spindle and movable between the cavities to extend between the first and second positions while retaining the orientation of the spindle with respect to the bolt body.

9 Claims, 6 Drawing Figures

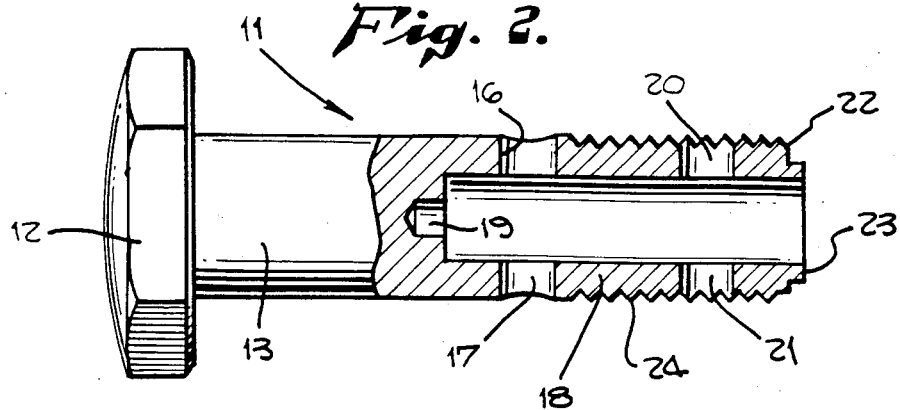
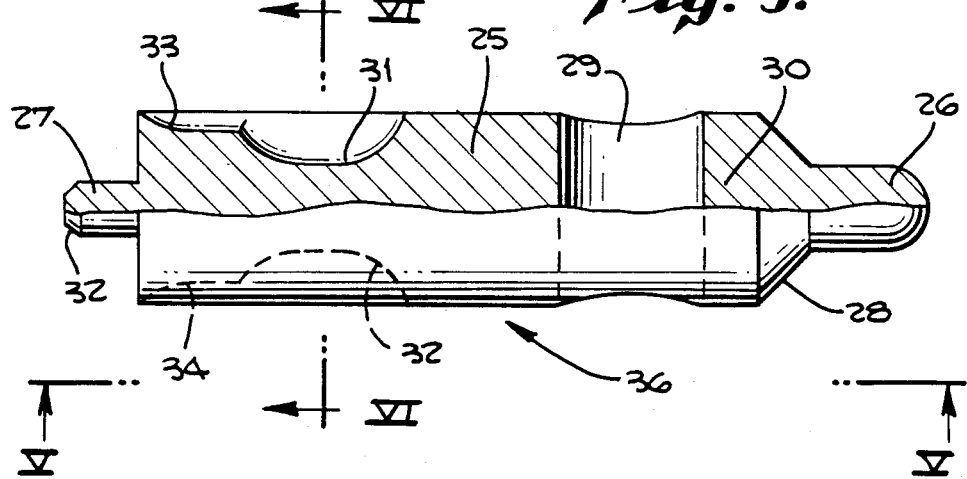
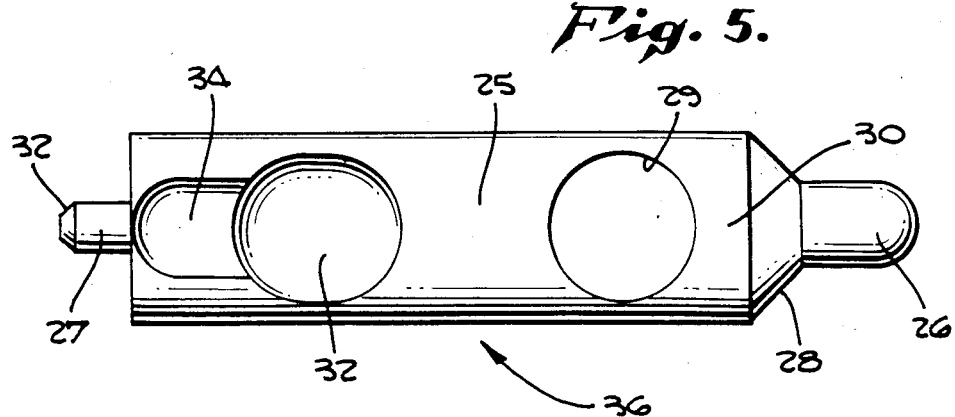

SELF-RETAINING POSITIVE LOCKING BOLT

BACKGROUND OF THE INVENTION

1. Field of the Invention

The invention relates to bolt fasteners; and, more particularly, to self-retaining positive locking bolts for use in aircraft or the like.

2. Description of the Prior Art

It has been the general practice in the aircraft industry to use bolts with castellated nuts and cotter pins to prevent nuts from becoming loose due to the vibration of the aircraft. On several occasions, after maintenance inspections or after repairs have been made on an aircraft, there have been instances where the bolt was inserted through the numbers to be secured together, but for some reason or other, the nut had not been fully threaded onto the bolt.

It can readily be seen that such mistakes or oversights on the part of ground maintenance crews could quite possibly result in the loss of a pilot and an aircraft should the bolt slide free of the members thus disconnecting the control linkage. These problems are particularly serious in high vibration environments, such as in aircrafts. There is thus a need for securing devices wherein the locking elements of the bolt keep the same in place even if the cotter pin is left off or breaks off, or the nut is either left off or unthreads due to vibration.

One such device is shown in U.S. Pat. No. 3,180,390 to Ockert. However, in this device, it is released at the head and material must be removed in the grip area of the shaft in the manufacture thereof. This weakens the device and minimizes use of bolts in certain high load operations.

Another such bolt is shown in U.S. Pat. No. 3,712,356 to Petroshanoff. This bolt requires a spring biased detent to remove the nut from the bolt body. Such detent and spring therefore must be carefully and precisely machined to operate properly. Another such bolt is shown in U.S. Pat. No. 4,278,120 to Hart et al. The Hart et al. bolt requires precise machining of the dog 38, the slope 44 on dog 38, and the surface 32 on cam member 30.

There is a need for a self-retaining positive locking bolt which remains in place even if the cotter pin or bolt is left off or the pin breaks or the nut unthreads, does not require careful and precise machinery of parts to be removable from a work structure and can be made easily and inexpensively from conventional bar stock.

SUMMARY OF THE INVENTION

It is an object of this invention to provide an improved self-retaining positive locking bolt.

It is a further object of this invention to provide a self-retaining positive locking bolt which remains in place even if the cotter pin or nut is removed, or the pin breaks or the nut backs off.

It is a further object of this invention to provide a self-retaining positive locking bolt which does not require precise machining of parts to provide a quick release from application structures in which it is installed.

These and other objects are preferably accomplished by providing a self-retaining positive locking bolt having a bolt body with a spindle retained within the bolt body. A detent is mounted in the bolt extending, in a first position, out of the bolt body, and, in a second position, extending internally from the bolt body. In both positions, the detent is mounted in aligned cavities in the spindle and movable between the cavities to extend between the first and second positions while retaining the orientation of the spindle with respect to the bolt body. This orientation aalso ensures proper installation of the cotter pins since the holes for the pin are always in aligned relationship and cannot move out of synchronization.

BRIEF DESCRIPTION OF THE DRAWING

FIG. 2 is a vertical cross-sectional view of the bolt body alone of the bolt of FIG. 1;

FIG. 3 is a vertical cross-sectional view of the spindle alone of the bolt of FIG. 1;

FIG. 5 is a view taken along lines V—V of FIG. 3; and

DESCRIPTION OF THE PREFERRED EMBODIMENT

Figure 1:
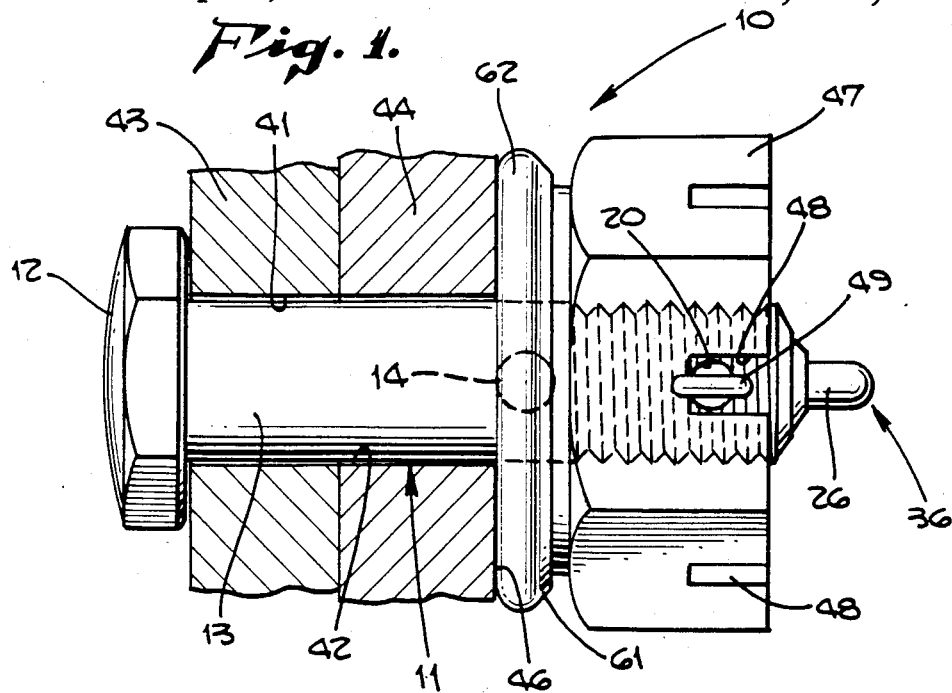
FIG. 1 is a vertical view, partly in section, of a bolt in accordance with the invention having a nut threaded thereon installed in an application.

Referring now to FIG. 1 of the drawing, a self-retaining positive locking bolt 10 is shown having a main bolt body 11 (see FIG. 2) with an enlarged head 12 at one end and a body portion 13 extending from head 12. A spindle 36 (see FIG. 3) is disposed internally of body portion 13 as will be discussed. A pair of detents, such as balls 14, 15, are mounted in openings 16, 17, respectively (see FIG. 4) in a cylindrical thin wall portion 18 of bolt body portion 13. Of course, any suitable detents may be used in place of balls 14, 15.

As seen in FIG. 2, bolt body portion 13 includes the aforementioned thin walled cylindrical portion 18 having holes or apertures 16, 17 therethrough. A cavity 19 is provided interiorly of portion 18 extending into the solid portion of bolt body 13 as shown. Bolt head 12 may be hex shaped, as seen in FIG. 1, or any suitable configuration. As seen in FIG. 2, a second set of apertures or holes 20, 21 may be provided in cylindrical portion 18. The front end of portion 18 may be chamfered, as at chamfer 22, and terminate in a snub nose 23 of lesser outer diameter than the outer diameter of the remainder of portion 18. Holes 16 and 20 are longitudinally aligned with each other as are holes 17 and 21. The portion of cylindrical portion 18 between holes 16, 17 and nose 23 is threaded as at thread section 24.

Figure 6:
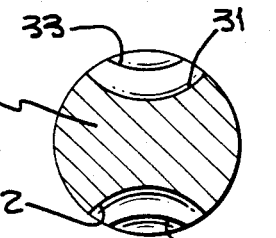
FIG. 6 is a view taken along lines VI—VI of FIG. 3.

Spindle 36 (FIG. 3) includes a main body portion 25 having a rounded extension portion 26 at one end and a chamfered extension portion 27, having chamfer 32, at the other end. Portion 26 may be greater in outer diameter than portion 27 and of substantially lesser outer diameter than body portion 25. Body portion 25 may also taper, at tapered portion 28, to extension portion 26. An aperture or hole 29 is provided between a first portion 30 connected to portion 26 and the remainder of body portion 25, the latter being essentially the same outer diameter as the outer diameter of portion 30. A pair of concave grooves 31, 32 are formed through body portion 25 remote from hole 29. These grooves 31, 32 (see also FIG. 5) are elongated and oval-shaped and extend to and meet (as seen in FIG. 3) a pair of shallower concave grooves 33, 34, respectively. These grooves 33, 34 are elongated, as seen in FIG. 5, and communication with the deeper grooves 31, 32 as clearly seen in FIGS. 3 and 6.

Figure 4:
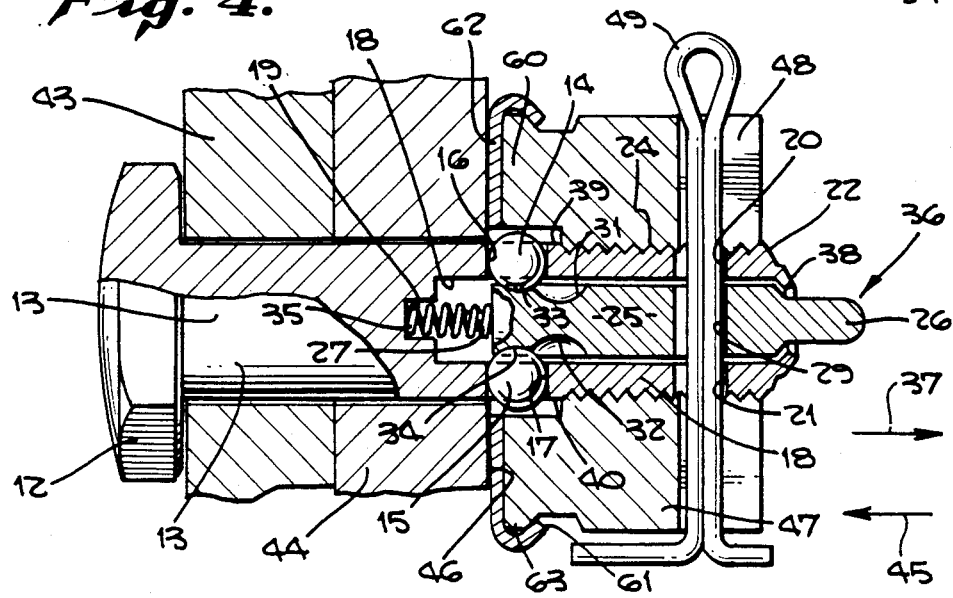
FIG. 4 is a vertical cross-sectional view of the bolt of FIG. 1 shown installed in a structure.

As seen in FIG. 4, a compression spring 35 is provided in cavity 19 extending into the interior of cylindrical portion 18 and surrounding extension portion 27 forcing spindle 36 in the direction of arrow 37 in FIG. 4.

In assembling the balls 14, 15, spindle 36, and spring 35 and bolt body 11, as can be appreciated by comparing FIGS. 2 and 4, spring 35 is placed around extension portion 27 and spindle 36 is inserted into bolt body 11, spring 35 entering cavity 19. The nose end 23 of bolt body 11 is swaged to form swage 38 (FIG. 4) and balls 14, 15 are placed through holes 16, 17 into cavities 33, 34. Holes 16, 17 are now staked at areas 39, 40, respectively, surrounding holes 16, 17, as is well known in the art to retain balls 14, 15 inside of holes 16, 17 (i.e., they cannot exit therefrom). As seen in FIG. 4, holes 20, 21 and 29 are aligned and adapted to receive a locking pin or cotter pin 49 or the like therethrough, as will be discussed.

In operation, as seen in FIGS. 1 and 4, bolt 10 may be inserted into aligned opertures 41, 42 in a pair of abutting panel members 43, 44, respectively. Prior to insertion, end 26 of spindle 36 is pushed in the direction of arrow 45 against the bias of spring 35 in FIG. 4 moving ball detents 14, 15 into cavities 31, 32 respectively. The allows insertion of bolt 10 into aligned apertures 41, 42 with spring 35 moving spindle 36 in the direction of arrow 37 in FIG. 4 to return ball detents 14, 15 back into cavities 33, 34 respectively, and thus in the panel locking position shown in FIGS. 1 and 4. The bolt 10 cannot be withdrawn from apertures 41, 42 due to engagement of ball detents 14, 15 with surface 46 of panel 44. Of course, if it is desired to remove bolt 10 from panels 43, 44, one merely pushes end 26 in the direction of arrow 45 permitting easy withdrawal. As seen in FIGS. 1 and 4, a nut can now be threaded onto the threaded section 24 and such nut may be a counterbored castellated self-locking nut thereby providing apertures 48 therethrough (FIG. 4) for receiving cotter pin 49 therethrough and through aligned holes 29 20 and 21, thus positively locking nut 47 to bolt 10. If it is desired to remove nut 47, pin 49 is withdrawn from nut 47, nut 47 (and washer 62) is unthreaded from section 24, spindle 36 is pushed in the direction of arrow 45 (FIG. 4), ball detents 14, 15 entering cavities 31, 32, and bolt 10 is then withdrawn from panels 43, 44.

As can be seen in the foregoing discussion, ball detents 14, 15 remain oriented on bolt body 11 in both positions in cavities 31, 32 or cavities 33, 34. The ball detents 14, 15 are not spring biased which eliminates the need for careful and accurate machining of parts. The bolt body 11 and spindle 36 may be made from conventional bar stock which is less expensive than parts that need to be specially machined.

Any suitable materials may be used such as metals, plastics, and the like.

Any suitable dimensions may be used. For example, spindle 36 may be about ⅛" in diameter, about 1" long, with cavity 31 about 0.031 to 0.033 inches in depth and cavity 33 about 0.010 to 0.012 inches in depth. Cavity 33 may be about 0.061 to 0.066 inches in length and cavity 31 may be about 0.139 to 0.144 inches in length (the overall length of both cavities being about 0.20 to 0.210 inches). Of course, cavities 32, 34 may be the same dimensions. Also, as seen in FIG. 5, cavity 34 (and of course, cavity 33 with respect to cavity 31) is narrower than cavity 32; e.g., cavity 34 may be about 0.064 inches wide and cavity 32 may be about 0.094 inches wide. Of course, all dimensions are purely relative and, again, any suitable dimensions may be used.

It can be seen that there is described an improved bolt which is self retaining and positive locking. The bolt will remain in place even if the cotter pin comes out or breaks off or if the pin or nut is left off completely or the nut backs off and unthreads during vibration. The cotter pin holes are oriented with respect to the cavities 32, 34 so that rotation of the parts is prevented and ensures that the cotter pin can be inserted.

Nut 47 may be a single unitary piece or, optionally, as shown in FIG. 4, nut 47 may have an end skirt portion 60 surrounding and trapping therebetween balls 14, 15. A washer 62 having an enlarged terminal lip 61 may be provided with lip 61 surrounding an enlarged end 63 on nut 47 thereby being attached to nut 47 and movable therewith.

The cotter pin, when properly installed, prevents the spindle from moving during vibration. Thus, the invention herein provides a check to see if the right bolt is used in the application since use of the wrong bolt would be noticed at installation of the cotter pin. Also, although a pair of cavities are disclosed, obviously more than two such cavities may be provided.

It can be seen that I have disclosed a self-retaining positive locking bolt which remains in place even if the cotter pin or bolt is left off, or if the cotter pin breaks or the nut unthreads during use in high vibration environments.

I claim:

1. In a self-retaining positive locking bolt having a bolt body with a head at one end and a threaded portion on the outer surface thereof at the other end, a spring biased spindle mounted internally of said bolt body normally biased to a rest position, and detent means associated with both said bolt body and said spindle for selectively extending a detent beyond the outer surface of said bolt body in a first position when said spindle is at its rest position, and extending said detent internally entirely within said bolt body in a second position, the improvement which comprises:

said detent means includes at least one detent trapped in an opening in said bolt body movable between said first and second positions, and said spindle is non-rotatable within said bolt body and axially movable therein and includes a pair of cavities, linearly aligned along the longitudinal axis of said spindle on the outer surface thereof, one of said cavities differing in depth from the other, both of said cavities being adapted to receive said detent therein whereby, when said detent is in said cavity of a lesser depth than the other of said cavities, said detent is in said first position, and when said detent is in said cavity of a greater depth than the other of said cavities, said detent is in said second position, and aligned openings extending through both the threaded portion of said bolt body and said spindle, remote from said first-mentioned opening in said bolt body and said cavities in said spindle, and normal to the central longitudinal axis of said spindle, for receiving a locking pin or the like therein, said aligned openings being oriented with respect to said cavities so that the spindle cannot rotate with respect to said bolt body to thereby maintain said openings in said bold body and said spindle in alignment.

2. In the bolt of claim 1 wherein the longitudinal axis of said aligned openings and lines extending axially through each of said cavities in a direction normal to the longitudinal axis of said spindle are linearly aligned and all lie in planes parallel to each other.

3. In the bolt of claim 1 including a nut having at least one slotted opening therethrough threaded onto the threaded portion of said bolt body and a cotter pin extending through the slotted opening in said nut and through the aligned openings in said spindle and bolt body.

4. In the bolt of claim 1 wherein said cavities communicate with each other whereby said detent moves from one of said cavities to the other.

5. In the bolt of claim 4 wherein said detent is a ball trapped in a hole in said bolt body resting in said cavity of lesser depth and movable into the other of said cavities when said spindle is moved against its spring bias.

6. In the bolt of claim 5 wherein at least two ball detents are provided trapped in respective holes in said bolt body and at least two sets of linearly aligned cavities of lesser and greater depth are provided in said spindle with one of said ball detents being disposed in one of the cavities of lesser depth and the other of said ball detents being disposed in the other of the cavities of lesser depth when said spindle is in its rest position.

7. In the bolt of claim 1 wherein said spindle includes a protrusion extending out of said bolt body when said spindle is in its rest position for engagement by an operator whereby pushing on said protrusion moves said spindle against its spring bias out of its rest position permitting said detent to move to its second position.

8. In the bolt of claim 1 wherein said spindle includes a protrusion thereon extending toward the head of said bolt body, said bolt body having an axially extending cavity adapted to receive said protrusion therein, and a spring disposed in said last mentioned cavity surrounding said protrusion normally biasing said spindle away from said last mentioned cavity to its rest position.

9. In the bolt of claim 1 wherein said cavities are shallow, elongated holes in the body of said spindle, said first mentioned cavity being substantially lesser in width than the other of said cavities.

* * * * *

UNITED STATES PATENT AND TRADEMARK OFFICE
CERTIFICATE OF CORRECTION

PATENT NO. : 4,655,657
DATED : April 7, 1987
INVENTOR(S) : John A. Duran

It is certified that error appears in the above-identified patent and that said Letters Patent are hereby corrected as shown below:

On the Title Page:

Assignee: delete "John A. Duran" insert -- Avibank Mfg., Inc., Burbank, Calif.-- patent.

Signed and Sealed this

Eleventh Day of August, 1987

Attest:

DONALD J. QUIGG

Attesting Officer

Commissioner of Patents and Trademarks